United States Patent
Hsiao et al.

(10) Patent No.: US 12,354,059 B2
(45) Date of Patent: *Jul. 8, 2025

(54) GEOFENCING TO REDUCE WAIT TIMES FOR ORDER PICKUPS

(71) Applicant: Maplebear Inc., San Francisco, CA (US)

(72) Inventors: Daniel Hsiao, San Francisco, CA (US); Jason Scott, San Francisco, CA (US); Michael Jablonski, San Francisco, CA (US); Nima Zahedi, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,291

(22) Filed: Aug. 15, 2023

(65) Prior Publication Data

US 2023/0385762 A1  Nov. 30, 2023

Related U.S. Application Data

(63) Continuation of application No. 16/670,447, filed on Oct. 31, 2019, now Pat. No. 11,763,251.

(51) Int. Cl.
*G06Q 10/087* (2023.01)
*G06Q 10/10* (2023.01)
(Continued)

(52) U.S. Cl.
CPC ......... *G06Q 10/087* (2013.01); *G06Q 10/103* (2013.01); *H04W 4/021* (2013.01); *H04W 4/029* (2018.02); *H04W 68/005* (2013.01)

(58) Field of Classification Search
None
See application file for complete search history.

(56) References Cited

U.S. PATENT DOCUMENTS

2010/0017126 A1   1/2010  Holcman et al.
2014/0249938 A1*  9/2014  Garrett .................. G06Q 50/12
                                              705/15
(Continued)

FOREIGN PATENT DOCUMENTS

WO   WO 2012/135143 A2   10/2012

OTHER PUBLICATIONS

United States Office Action, U.S. Appl. No. 16/670,447, filed Dec. 10, 2020, 42 pages.
(Continued)

*Primary Examiner* — Jinsong Hu
*Assistant Examiner* — Alexander J Yi
(74) *Attorney, Agent, or Firm* — Fenwick & West LLP

(57) ABSTRACT

A system receives an order from one or more user client devices associated with an account of the system, and transmits a first notification to the one or more user client devices that an order is ready for pick up at a pickup location. The system receives location data from a particular user client device of the one or more user client devices. The system determines an outer geofence based in part on a running average time or wait time at the pickup location in a recent time period, a size of the order, or a historical wait time associated with the account. In response to receiving an indication from the particular user client device that a user associated with the particular user has entered the determined outer geofence, the system transmits a second notification to a runner client device.

20 Claims, 8 Drawing Sheets

(51) Int. Cl.
  *H04W 4/021*    (2018.01)
  *H04W 4/029*    (2018.01)
  *H04W 68/00*    (2009.01)

(56)                  References Cited

U.S. PATENT DOCUMENTS

2014/0279269 A1*  9/2014  Brantley ............ G06Q 30/0635
                                                    705/26.81
2016/0292664 A1*  10/2016 Gilfoyle ............. G06Q 20/3224
2017/0018041 A1*  1/2017  Fox .................... G06Q 20/3224
2018/0268370 A1*  9/2018  Fallah ................. H04L 63/0428

OTHER PUBLICATIONS

United States Office Action, U.S. Appl. No. 16/670,447, filed Jun. 26, 2020, 37 pages.

* cited by examiner

GEOFENCING TO REDUCE WAIT TIMES FOR ORDER PICKUPS

CROSS REFERENCE TO RELATED APPLICATIONS

This application is a continuation of co-pending U.S. application Ser. No. 16/670,447, filed Oct. 31, 2019, which is incorporated by reference in its entirety.

BACKGROUND

This disclosure relates generally to reducing and measuring user wait times when picking up orders at a physical location, using geofences and customer location data.

In current online concierge systems, a customer may place an order from a retailer, such as a grocer or market, to be picked up in person at a later time. A picker at the retailer may gather the items from the order, and the customer may travel to the retailer, or a pickup location, to retrieve the order. But once a customer is in transit, runners at the pickup location do not know when they should bring the order out to the customer. For example, one customer may only need to travel one mile to the pickup location, meaning they quickly arrive to gather their order, while another may be traveling from five miles away, which makes timing for order handoff difficult for runners. Since some items of the order may be refrigerated, a runner would not bring the items outside for pick up unless the customer has almost arrived to avoid melting or spoiling food. Because of this, once a customer arrives, they may have to wait for the runner to retrieve their order and find them outside at the pickup location. Due to a variety of factors affecting the time it takes a customer to pick up an order, runners have no way of reliably determining when to bring the order outside to the pickup location for handoff, reducing efficiency in the handoff process for orders from the online concierge system.

Retailers may also want to measure customer wait times to understand and improve their fulfilment efficiency. However, accurately measuring wait times poses a difficulty for retailers since wait times are contingent upon customer behavior. Since a wait time begins once a customer arrives at a pickup location, a retailer would either need runners to manually record wait times or request that customers indicate, via an online concierge system, the time of their arrival or an estimated wait time. Both of these processes are cumbersome and prone to human error given that measuring the wait time relies upon either a runner or customer to start a timer or enter a number.

SUMMARY

To reduce wait times and improve efficiency for customers who are picking up orders at a merchant location, an online concierge system uses customer location information to determine when the customers are near the location or are likely to arrive. The customers enable sharing of their location data through a customer mobile application associated with the online concierge system. Based on this shared location information, the system initiates the picking of the customers' orders so that the orders are ready when the customers arrive at the location but do not stay outside waiting for the customers to arrive (i.e., as close to the arrival time of the customers as possible). The online concierge system may also use the customers' location information to determine the customers' wait times at the location. For example, a wait time may be computed as the difference between a time when a customer has arrived at the location and the time that a confirmation has been received that the order was picked up.

In one example, the online concierge system receives an order from a customer client device indicating items for purchase from a retailer at a specified location. A picker at the location assembles the order for handoff to the customer, and the online concierge system transmits a first notification to the customer client device that the order is ready for pick up. The online concierge system receives location data from the customer client device describing the location of the customer client device as the customer travels to the pickup location. The online concierge system receives a first indication that the customer client device has entered an outer geofence, and, in response, transmits a second notification to a runner client device at the location indicating that the customer is in transit to the pickup location. The online concierge system then receives a second indication that the customer client device has entered an inner geofence, which is closer to the pickup location than the outer geofence. In response, the online concierge system starts a timer or otherwise records the time when the customer entered the inner geofence. When the online system receives a confirmation that the order has been picked up by the customer, it stops the timer and computes a wait time for the customer.

By setting the outer geofence to a distance from the location that will take the customer about as much time to arrive as it will take a runner to pick the order, the online system may optimize the order so that it is picked just as the customer is arriving, thereby minimizing the customer's wait time and the time a picked order sits for pickup. By setting the inner geofence to a distance that closely approximates the location itself or a designated pickup spot at the location, the online system can use the difference in time from the customer's entering the inner geofence and the pickup confirmation as an accurate proxy for the customer's wait time at the location. The outer geofence may be fixed, or it may be determined dynamically based on traffic, weather, customer's velocity, and any other contextual conditions that may affect the customer's estimated arrival time. The outer geofence may also be determined based on an estimate of a time it will take to pick the order, which may be a running average time of recent orders and also based on the size of the order and the runner's historical handoff times. The outer geofence may also be adjusted using recently computed wait times as a feedback signal, e.g., increasing the geofence if the wait times are unacceptably high, thereby initiating picking of the order sooner.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Environment of an Online Concierge System

Figure 1:
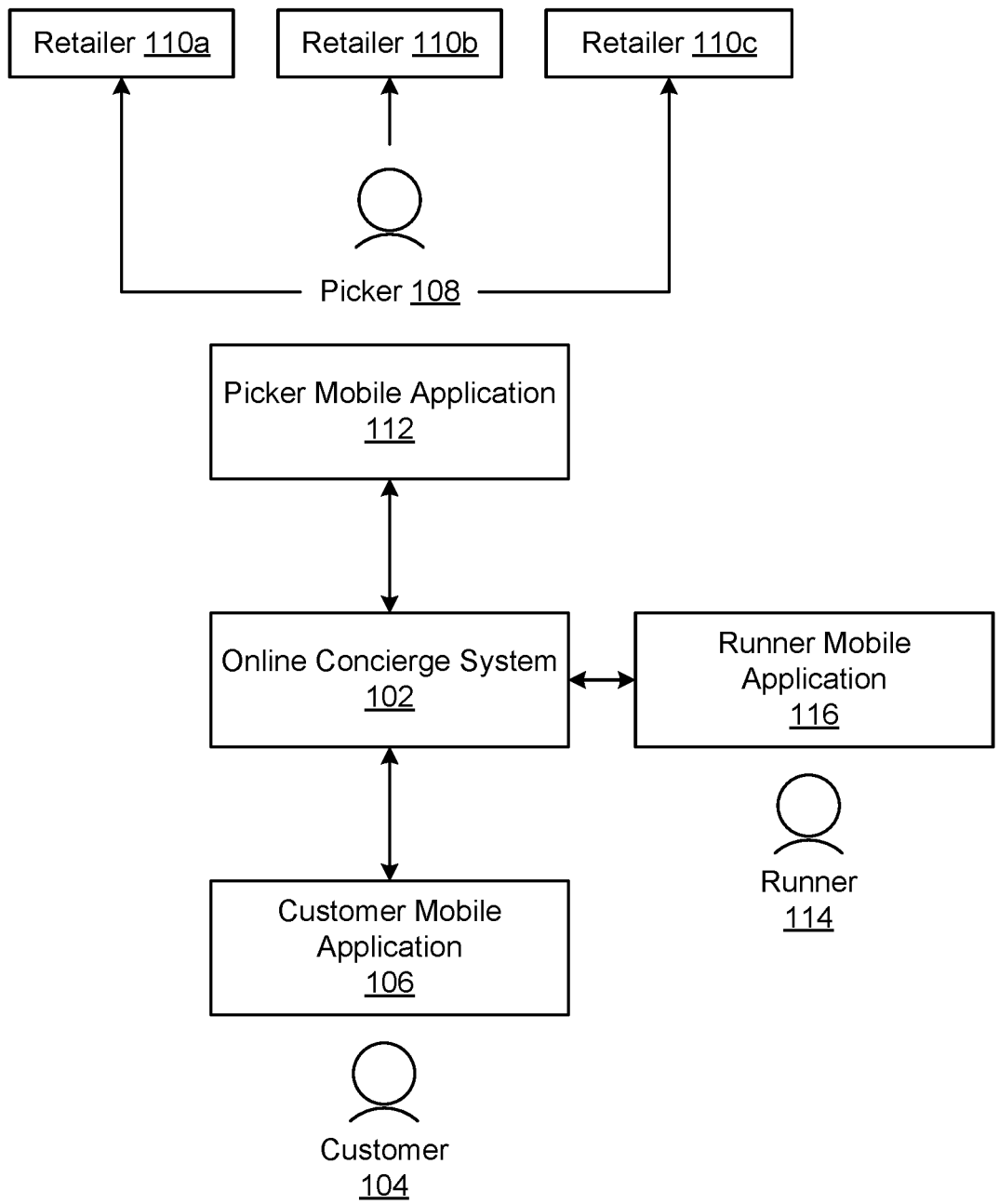
FIG. 1 illustrates the environment of an online concierge system, according to one embodiment.

FIG. 1 illustrates the environment 100 of an online concierge system 102, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The online concierge system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The environment 100 also includes three retailers 110a, 110b, and 110c (only three are shown for the sake of simplicity; the environment could include hundreds of retailers). The retailers 110 may be physical retailers, such as grocery stores, discount stores, department stores, etc., or non-public warehouses storing items that can be collected and delivered to customers. Each picker 108 fulfills an order received from the online concierge system 102 at one or more retailers 110, delivers the order to the customer 104, or performs both fulfillment and delivery. In one embodiment, pickers 108 make use of a picker mobile application 112 which is configured to interact with the online concierge system 102.

Online Concierge System

Figure 2:
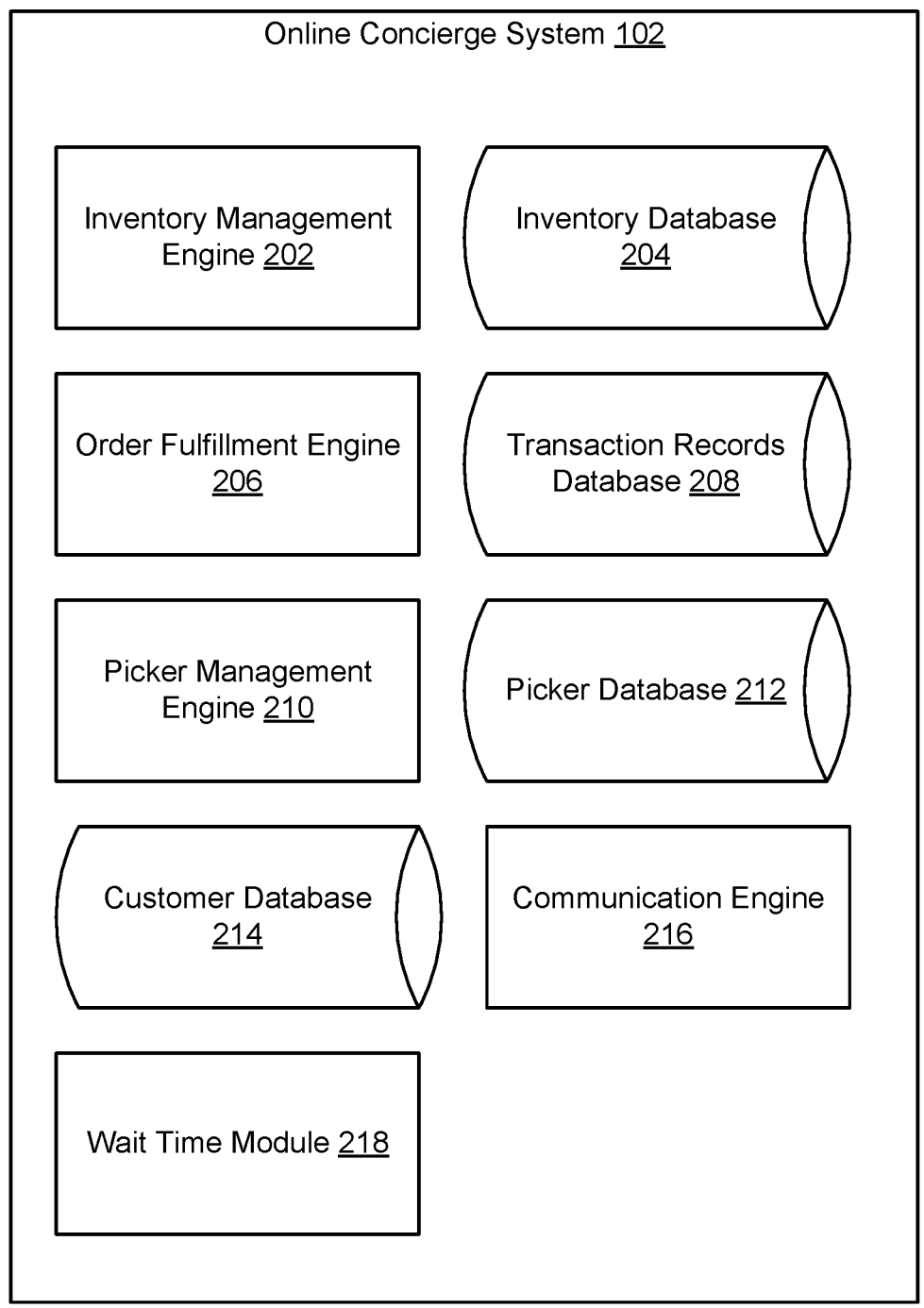
FIG. 2 is a block diagram of an online concierge system, according to one embodiment.

FIG. 2 is a block diagram of an online concierge system 102, according to one embodiment. The online concierge system 102 includes an inventory management engine 202, which interacts with inventory systems associated with each retailer 110. In one embodiment, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which retailers 110. The order fulfillment engine 206 determines a sale price for each item ordered by a customer 104. Prices set by the order fulfillment engine 206 may or may not be identical to in-store prices determined by retailers (which is the price that customers 104 and pickers 108 would pay at retailers). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with retailer 110. For example, after successful fulfillment of an order, the order fulfillment engine 206 may transmit a summary of the order to the appropriate retailer. The summary may indicate the items purchased, the total value of the items, and in some cases, an identity of the picker 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate retailer 110 to fulfill the order based on one or more parameters, such as the contents of the order, the inventory of the retailers, and the proximity to the delivery location. The picker management engine 210 then identifies one or more appropriate pickers 108 to fulfill the order based on one or more parameters, such as the pickers' proximity to the appropriate retailer 110 (and/or to the customer 104), his/her familiarity level with that particular retailer 110, and so on. Additionally, the picker management engine 210 accesses a picker database 212 which stores information describing each picker 108, such as his/her name, gender, rating, previous shopping history, and so on. The picker management engine 210 transmits the list of items in the order to the picker 108 via the picker mobile application 112. The picker database 212 may also store data describing the sequence in which the pickers' picked the items in their assigned orders.

As part of fulfilling an order, the order fulfillment engine 206 and/or picker management engine 210 may access a customer database 214 which stores information describing each customer. This information could include each customer's name, address, gender, shopping preferences, favorite items, stored payment instruments, and so on.

The online concierge system 102 may use a communication engine 216 that transmits information between the customer mobile application 106, the picker mobile application 112, and the runner mobile application 116. The information may be sent in the form of messages, such as texts or emails, or notifications via application, among other forms of communication. The communication engine 216 may receive information from each application about the status of an order, the location of a customer in transit, issues with items in an order, and the like. The communication engine 216 determines a message or notification to send to a customer 104, picker 108, or runner 114 based on this information and transmits the notifications to the appropriate application. For example, the online concierge system 102 may receive information from the customer mobile application 106 indicating that a customer 104 is traveling to the pickup location to retrieve an order. Based on this information, the communication engine 216 sends a notification to the runner mobile application 116 indicating that the customer 104 associated with a specific order is in transit, which may incite the runner 114 to retrieve the order for pick up. In another example, the online concierge system 102 may receive a message from the picker mobile application 112 that an item of an order is not available. The communication engine 216 may transmit the message to the customer mobile application 106 associated with the order.

The online concierge system 102 includes a wait time module 218 used to calculate wait times for order deliveries. The wait time module 218 retrieves location data from the customer mobile application 106 indicating the location of a customer 104 and determines geofence locations around a pickup location to calculate wait times. A geofence is a geographic boundary surrounding a geographic location (i.e., a pickup location). In some embodiments, a geofence is located in a circle at a radial distance from the pickup location. In other embodiments, the geofence is a different shape other than a circle or is unequally dispersed around the pickup location. For example, a geofence may be shaped such that a customer 104 traveling to the pickup location from one direction may enter the geofence closer to the pickup location than a customer 104 traveling from another direction. The geofence may be evenly dispersed around a pickup location based on distance or travel time to the pickup location 400. For example, the wait time module 218 may use traffic data or the layout of roads near the pickup location to set a geofence around the pickup location at an estimated five minutes of travel away. In another example, wait time module 218 may place a geofence at a one-mile distance from the pickup location. In some embodiments, the wait time module 218 may place the geofence based on a customer's 104 location data, such as average speed or starting location. The wait time module 218 may update the locations of geofences based on wait time data gathered from historical order deliveries, and each pickup location may have different geofences based on data associated with the pickup location.

In some embodiments, the wait time module 218 stores two geofences around each pickup location: an inner geofence and an outer geofence. The outer geofence has a larger radius than the inner geofence. The wait time module 218 places the outer geofence at a distance from a pickup location such that the time for the customer 104 to arrive at the pickup location after traversing the outer geofence is the same amount of time it takes for a runner 114 to retrieve the customer's 104 order. In some embodiments, the outer geofence fixed at a distance from the pickup location. In other embodiments, the wait time module 218 dynamically updates the location of the outer geofence based a variety of feedback signals describing the wait times of customers 104 at the pickup location. In particular, if signals indicate that customers 104 are experiencing high wait times at a pickup location, the wait time module 218 may change the location of the outer geofence. Signals may include historical wait times for the customer 104, historical wait times for customers 104 at that pickup location, average wait time of recent orders at the location, size of the order, or the runner's 114 historical handoff time of orders to a pickup spot at the pickup location. In some embodiments, the wait time module 218 may analyze the signals to determine the average wait time at the pickup location over a recent time period and increase the distance of the outer geofence if the wait times are above a threshold wait time either on average or collectively. Increasing the distance of the outer geofence allows runners 114 to retrieve orders earlier, thereby reducing the wait time for customers. In some embodiments, the wait time module 218 may also alter the outer geofence location based on the expected travel time of the customer 104 to the pickup location using traffic data, weather data, the customer's velocity, or other contextual conditions that affect the customer's estimated arrival time at the pickup location.

The wait time module 218 also sets the inner geofence at a distance approximate to the pickup location itself and uses the time between when a customer 104 enters the inner geofence and a pickup confirmation from the runner as the wait time for the customer 104. In some embodiments, the inner geofence is set at a fixed distance. The wait time module 218 uses the inner geofence with the pickup confirmation from the runner 114 to determine a wait time for the customer. The wait time module 218 receives a start time when a customer 104 crosses the inner geofence, as communicated via an indication from the customer mobile application 106, and an end time when a runner 114 confirms handoff of the order. The wait time module 218 calculates the wait time as the time from the start time to the end time and stores the wait time the customer database in relation to the location. The wait time module 218 accesses and uses the stored wait times to alter the geofence distances and estimate wait times for customers 104 upon arrival at a pickup location.

Figure 3A:
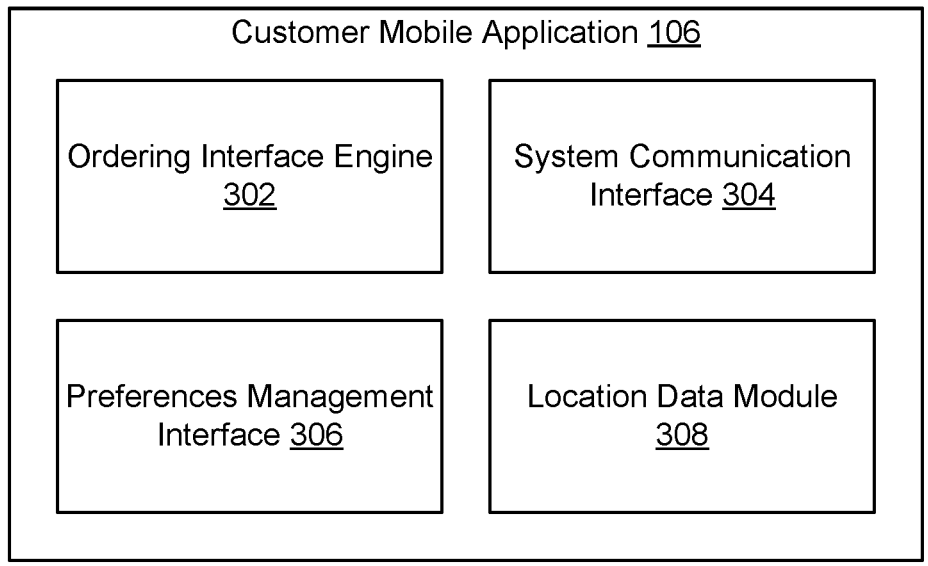
FIG. 3A is a block diagram of the customer mobile application (CMA), according to one embodiment.

FIG. 3A is a block diagram of the customer mobile application (CMA) 106, according to one embodiment. The customer 104 accesses the CMA 106 via a client device, such as a mobile phone, tablet, laptop, or desktop computer. The CMA 106 may be accessed through an app running on the client device or through a website accessed in a browser. The CMA 106 includes an ordering interface 302, which provides an interactive interface with which the customer 104 can browse through and select products and place an order. Customers 104 may also use the ordering interface to message with pickers 108 and runners 114 and receive notifications regarding the status of their orders. The CMA 106 also includes a system communication interface 304 which, among other functions, receives inventory information from the online concierge system 102 and transmits order and location information to the online concierge system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred retailers 110, preferred handoff times, special instructions for handoff, and so on.

The CMA 106 also includes a location data module 308. The location data module 308 may access and store location data related to a client device associated with a customer 104 via the customer mobile application 106. Location data may include the geographic location of the client device associated with the customer mobile application 106, how fast the client device is travelling, the average speed of the client device when in transit, the direction of travel of the client device, the route the customer 104 is taking to a pickup location, current traffic data near the pickup location, and the like. For simplicity, the location of a customer client device or client device may be referred to as the location of the customer throughout this description. The customer 104 may specify whether or not the share this location data with the customer mobile application 106 via the preferences management interface 306. If a customer 104 does not allow the customer mobile application 106 to access their location data, the location data module 308 may not access any location data for the customer 104. In some embodiments, the customer 104 may specify certain scenarios when the location data module 308 may receive location data, such as when the customer 104 is using the customer mobile application 106, any time, or when the customer 104 turns on location tracking in the customer mobile application 106 via an icon. The customer 104 may also specify which location data the location data module 308 may retrieve, and which location data is off-limits. In some embodiments, the location data module 308 may be tracking the customer's 104 location as a background process while the CMA 106 is in use. In other embodiments, the CMA 106 may use real-time location data from the location data module 308 to display a map to the customer 104 indicating their current location and the route to a pickup location for their order.

The location data module 308 may determine the customer's 104 location relative to a retailer 110 or pickup location using the location of the customer's client device. In some embodiments, the retailer 110 and the pickup location are at the same location. The location data module 308 may also store information indicating the location of geofences around each pickup location retrieved from the online concierge system 102. The location data module 308 may also send location data to the online concierge system 102 to update the location of geofences.

The location data module 308 may send indications to the online concierge system 102 when a customer 104 enters a geofence on the way to pick up an order. Each geofence may be associated with different indications that direct the online concierge system 102 to perform different processes, such as sending a notification to the CMA 106 or updating the customer's 104 location data in the location data module 308. In particular, the location data module 308 sends an indication to the online concierge system 102 indicating that the customer 104 is in transit to the pickup location in response to location data indicating that a customer 104 has entered the outer geofence. This triggers the online concierge system 102 to send a notification to the runner mobile application 116 that the customer 104 is on their way to pick up their order. In some embodiments, the location data module 308 also includes an expected time of arrival of the customer 104 with the notification based on the customer's 104 location data. In response to location data indicating that the customer 104 has entered the inner geofence, the location data module 308 sends an indication to the online concierge system 102 to send a notification to the customer mobile application 106 indicating an estimated wait time for the customer and to retrieve a start time.

Figure 3B:
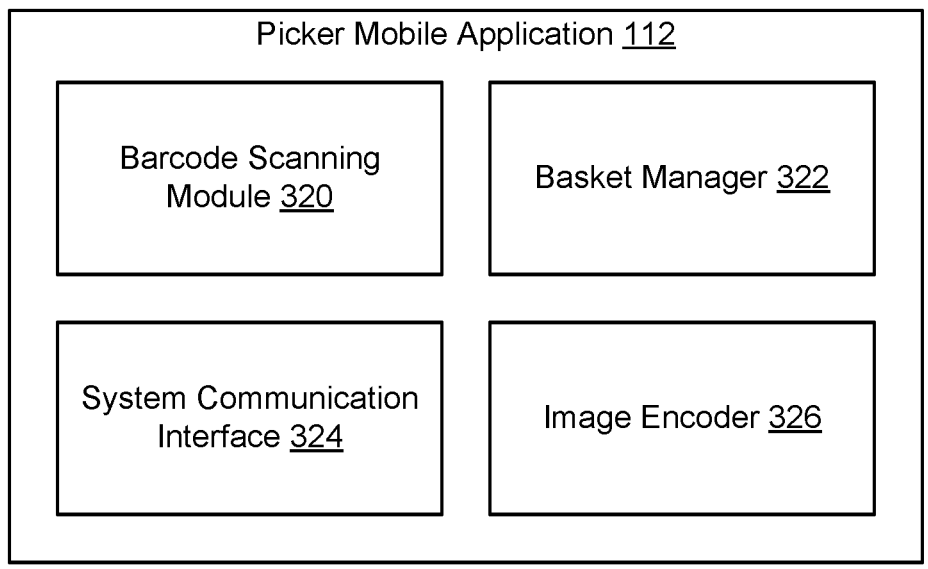
FIG. 3B is a block diagram of the picker mobile application (PMA), according to one embodiment.

FIG. 3B is a block diagram of the picker mobile application (PMA) 112, according to one embodiment. The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a retailer 110. This running record of items is commonly known as a "basket". In one embodiment, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a customer updates an order to include more or less items. The system communication interface may receive notifications and messages from the online concierge system 102 indicating information about an order. The system communication interface transmits notifications and messages to be displayed via a user interface of the mobile deice associated with the PMA 112.

Figure 3C:
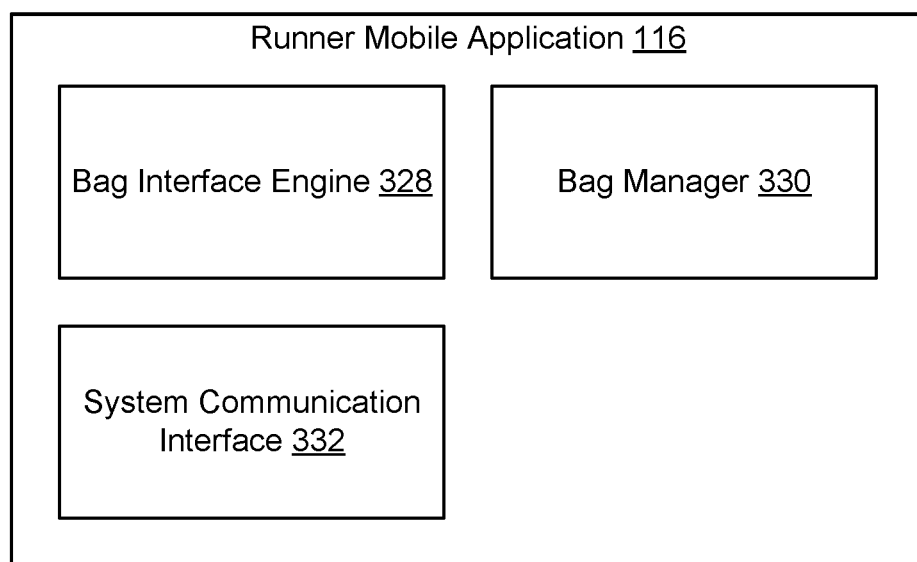
FIG. 3C is a block diagram of the runner mobile application (RMA), according to one embodiment.

FIG. 3C is a block diagram of the runner mobile application (RMA) 116, according to one embodiment. The runner 114 accesses the RMA 116 via a client device, such as a mobile phone, tablet, laptop, or desktop computer. The RMA 116 may be accessed through an app running on the client device or through a website accessed in a browser. The RMA 116 includes bag interface engine 328, which provides an interactive interface with which the runner 114 can view orders they need to deliver and the locations of the bags for each order, such as on a particular shelf or in a refrigerator of a pickup location. The runner 114 may receive notifications through the bag interface engine 328 about new orders, the location of a customer 104 who is in transit to a pickup location, and new orders to deliver. The runner 114 may also receive communications via the bag interface engine 328 with customers regarding order handoff and pickup confirmation and may interact with the interface generated by the bag interface engine 328 to send communications to customers and the online concierge system 102 regarding order status. For example, a runner 114 may send the customer a pickup spot at the pickup location to meet for order handoff and indicate that an order has been delivered to a customer via the interface, which ends the wait time calculation by the location data module 308 associated with the customer.

The RMA 116 includes a bag manager 330 that manages the assignment of orders to runners 114 and the locations of bags for each order. The RMA 116 also includes a system communication interface 332 which, among other functions, receives inventory information from the online concierge system 102 and transmits order and bag information to the online concierge system 102. The system communication interface may also receive notifications and messages from the online concierge system 102 indicating information about an order. The system communication interface transmits notifications and messages to be displayed via a user interface of the mobile deice associated with the RMA 116.

Figure 4A:
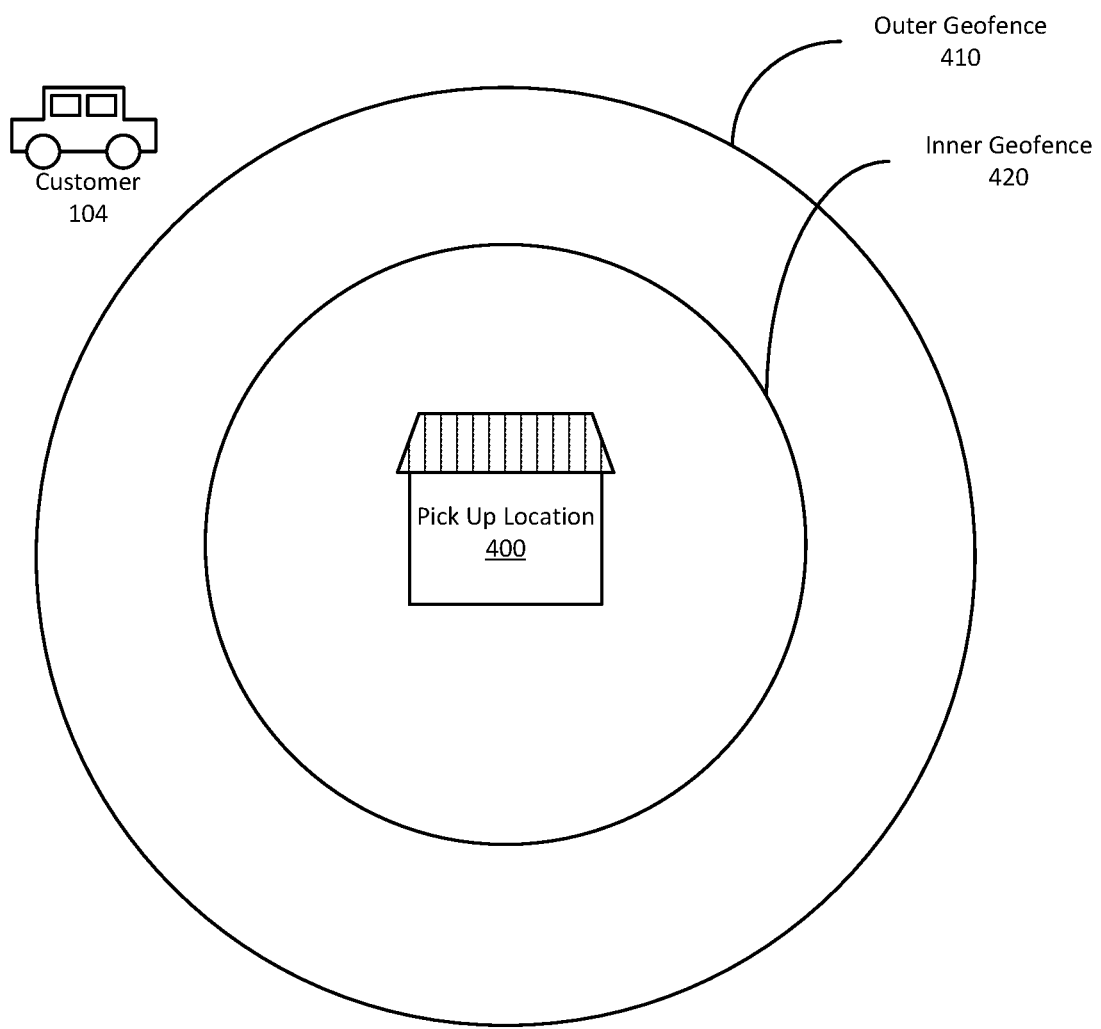
FIGS. 4A-4C illustrate an example of sending notifications based on a customer's location data relative to a series of geofences, according to one embodiment.
Figure 4A:
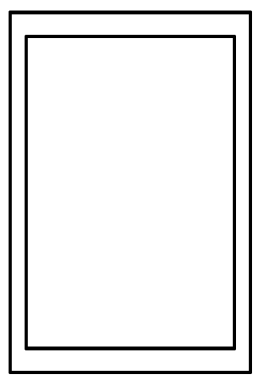
Figure 4A:
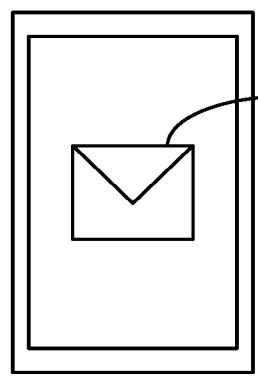
Figure 4B:
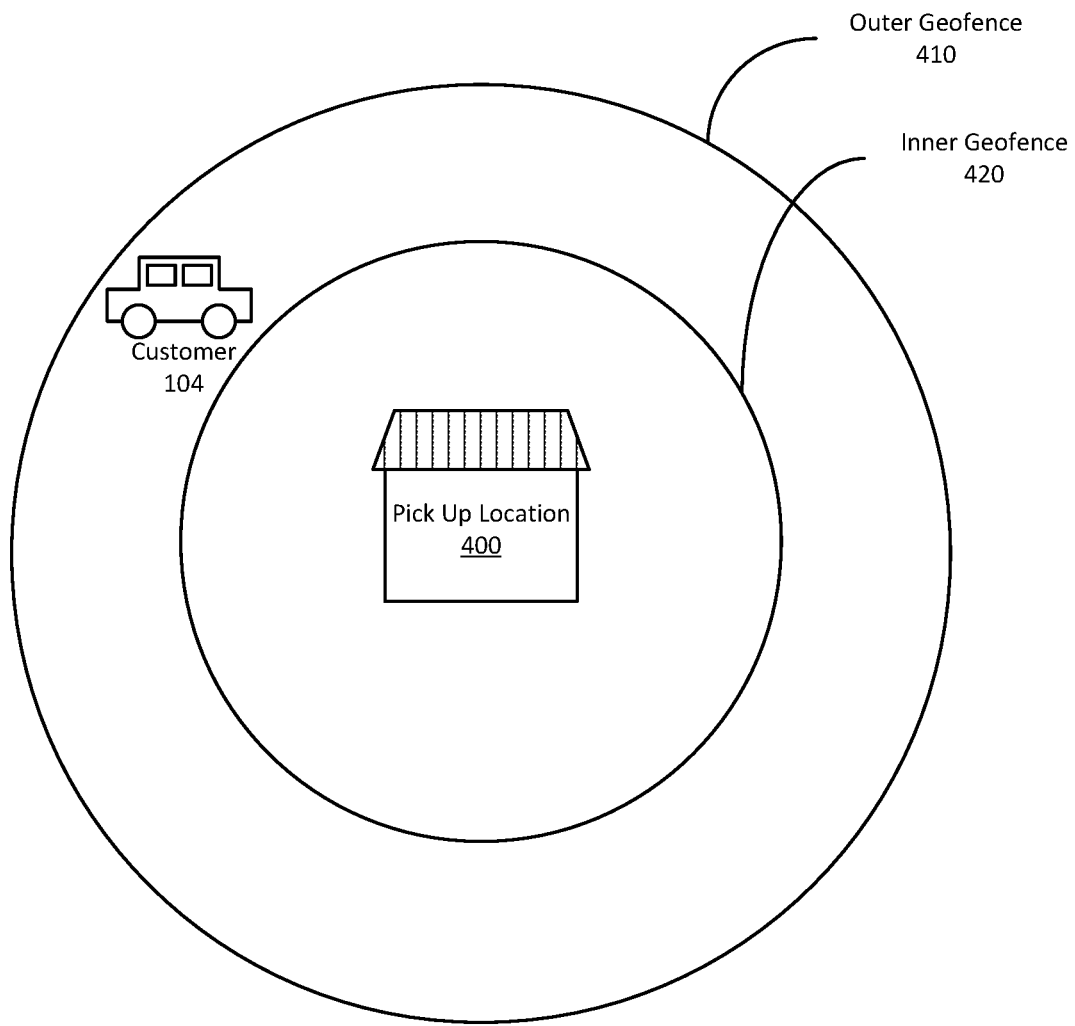
Figure 4B:
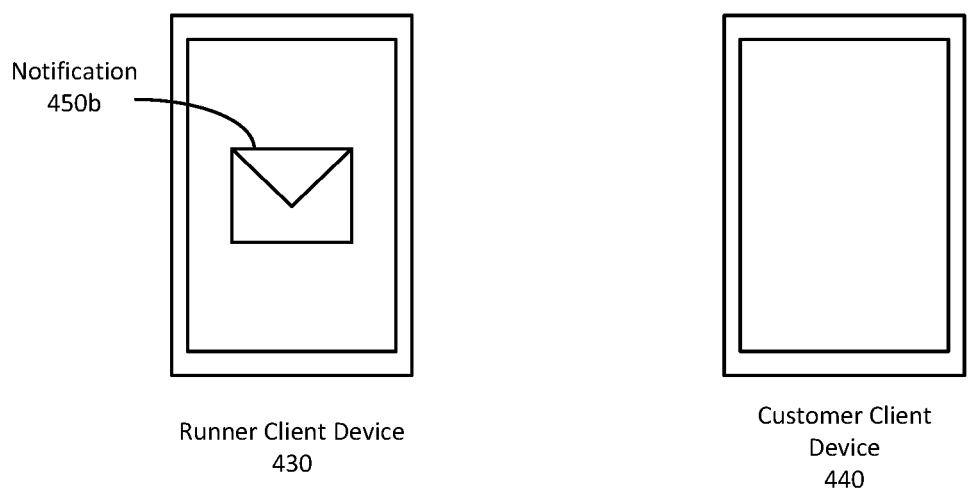
Figure 4C:
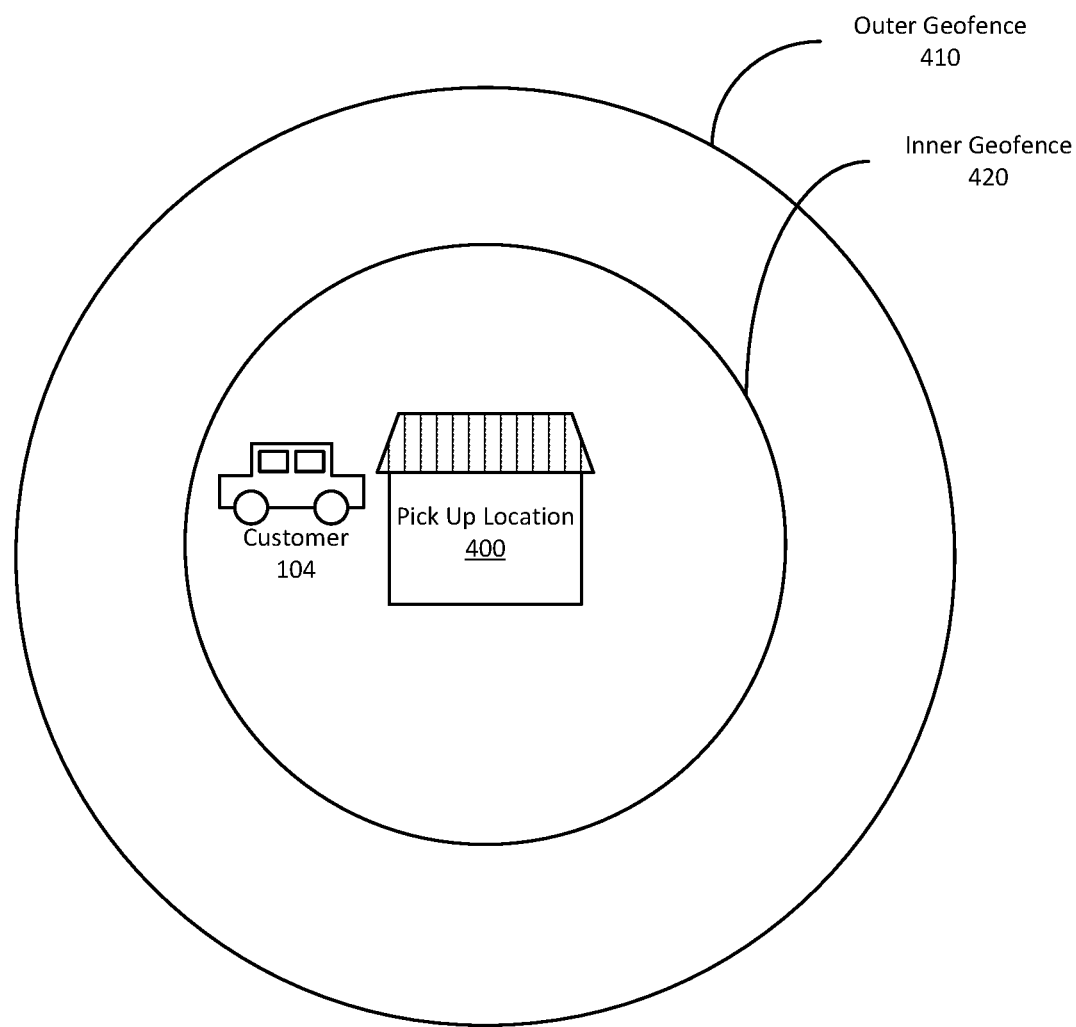
Figure 4C:
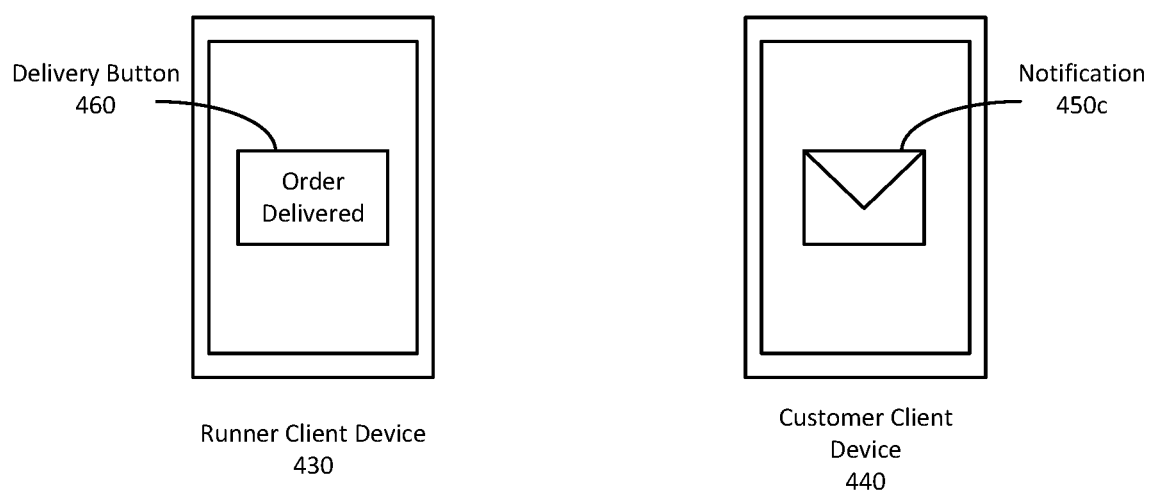

FIGS. 4A-4C illustrate an example of a sending notifications based on a customer's location data relative to a series of geofences, according to one embodiment. In these figures, the customer 104 has indicated that their location data may be used by the customer mobile application 106. In FIG. 4A, the customer 104 is on their way to the pickup location 400 to pick up their order. Surrounding the pickup location 400 are two geofences: an outer geofence 410 and an inner geofence 420. The customer client device 440 has received a notification 450a indicating that the customer's 104 order is ready for pick up. The customer 104 has not crossed either geofence, so no other notifications have been sent to the customer client device 440 or the runner client device 430 in this embodiment.

In FIG. 4B, the customer has entered the outer geofence 410 on their way to the pickup location 400. The runner client device 430 has received a notification 450b that the customer 104 is on their way. This gives the runner 114 time to retrieve the order for the customer's 104 arrival at the pickup location 400. In FIG. 4C, the customer 104 has passed the inner geofence 420, which has prompted the online concierge system 102 to retrieve a start time that is used measure the wait time of the customer 104. The runner may interact with the delivery button 460 on the runner client device 430 to trigger the online concierge system 102 to retrieve an end time, which is used with the start time to calculate a total wait time of the customer 104. In some embodiments, the customer client device 440 to receives a notification 450c indicating an estimated wait time at the pickup location 400 upon entering the inner geofence 420.

Figure 5:
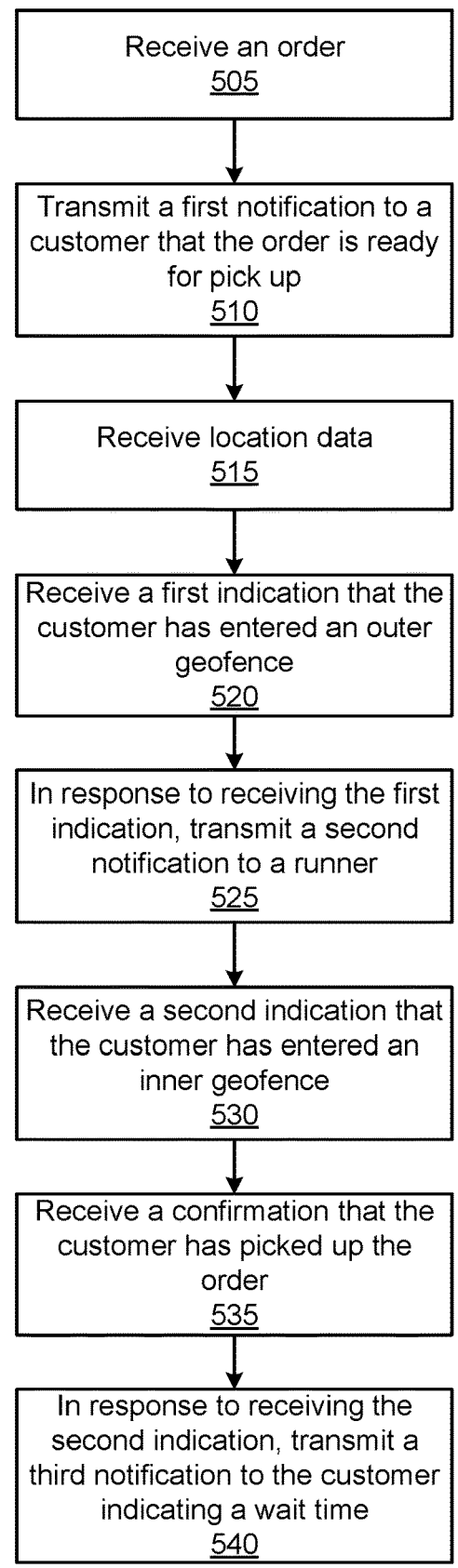
FIG. 5 is a flowchart illustrating the use of geofences to reduce the wait time of a customer.

FIG. 5 is a flowchart illustrating the use of geofences to reduce the wait time of a customer. The online concierge system 102 receives 505 an order from a customer 104 via the customer mobile application 106. The order may specify a plurality of items the customer 104 wants to purchase, such as grocery or household items. A picker 108 retrieves items in the order from a retailer 110. The picker 108 puts the items of the order in bags and stores them in a pickup area, which may be a shelf or refrigerator within the pickup location 400 or retailer 110. The picker 108 indicates through the picker mobile application 112 that the order is ready for the customer 104 to pick up from the pickup location 400.

The online concierge system 102 transmits a first notification 450a to the customer client device 440 indicating that the order is ready for pick up. The customer 104 begins travelling to the pickup location, and the online concierge system 102 receives 515, via the customer client device 440, location data indicating the location of the customer 104. In some embodiments, the customer mobile application 106 provides the customer 104, via the customer client device 440, a route to take to the pickup location 400 and updates the route based on the customer's 104 location data.

The online concierge system 102 receives 520 a first indication that the customer 104 has entered an outer geofence 410. The outer geofence 410 encloses an area around the pickup location 400 and may be dispersed around the location based on distance or travel time to the pickup location 400. In response to receiving the first indication, the online concierge system 102 transmits 525 a second notification 450b to the runner client device 430 indicating that the customer 104 is currently traveling to the pickup location 400. The notification 450b may also include information describing the estimated arrival time of the customer 104, the vehicle type associated with the customer 104, the name of the customer 104, or any other information the runner 114 could use to identify the customer 104 upon arrival. The runner 114 may retrieve the customer's 104 order from the pickup area and bring it to a pickup spot (e.g. the curbside) at the pickup location 400.

The online concierge system 102 receives 530 a second indication that the customer 104 has entered an inner geofence 420. The inner geofence 410 encloses an area around the pickup location 400 and is located within the outer geofence 410. The online concierge system 102 receives 535 a confirmation that the customer has picked up the order at the pickup location 400 form the RMA 116. The online concierge system 102 determines 540 a wait time for the customer 104 based on the second indication and the confirmation. In some embodiments, the online concierge system 102 also transmits a third notification 450 to the runner client device 430 indicating that the customer 104 is at the pickup location 400.

It is appreciated that although FIG. 5 illustrates a number of interactions according to one embodiment, the precise interactions and/or order of interactions may vary in different embodiments. For example, in some embodiments, the online concierge system 102 receiving a third indication from the customer client device 440 that the customer 104 is currently using the customer mobile application 106. In response, the online concierge system 102 receives location data from the customer client device 440. In other embodiments, the online concierge system 102 only receives location data if the customer client device 440 is moving and the customer 104 has been notified of an order that is ready for pick up, in addition to the customer mobile application 106 being in use. In other embodiments, the online concierge system 102 may receive location data in response to an indication from the customer client device 440 indicating the customer 104 has permitted their location data to be used.

In some embodiments, the online concierge system 102 retrieves a start time in response to receiving the second indication. In response to receiving the confirmation, the online concierge system 102 receives an end time indicating the customer 104 has received the order. The online concierge system 102 computes a wait time based on the start time and end time and, in some embodiments, stores the wait time as customer data in the customer database 214. The online concierge system 102 may use this wait time data to implement features to further reduce wait time for other orders or alter the distances of the geofences to further reduce wait times. This customer data may be further used to determine personal geofences for the customer 104, such that each customer 104 may have different outer geofences 410 and inner geofences 420 determined based on customer data and location data. Further, each pickup location 400 may have its own outer geofence 410 and inner geofence 420. The outer geofences 410 and inner geofences 420 for each pickup location 400 may be determined based on collective customer data and location data describing information such as average wait times for customers 104, the average transit times for customers 104, and the like.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
    receiving an order from one or more user client devices, the one or more user client devices associated with an account of an online system;
    transmitting a first notification to the one or more user client devices that the order is ready for pick up at a pickup location;
    receiving location data from a particular user client device of the one or more user client devices, wherein the location data describes location of the particular user client device;
    determining an outer geofence based in part on a running average time or wait time at the pickup location in a recent time period, a size of the order, and a historical wait time associated with the account;
    receiving a first indication from the particular user client device that a user associated with the particular user client device has entered the determined outer geofence;
    in response to receiving the first indication, transmitting a second notification to a runner client device of a runner indicating that the user associated with the particular user client device is in transit to the pickup location, wherein the runner retrieves the order for the user based on the second notification;
    determining the pickup location of a plurality of pickup locations; and
    determining an inner geofence of the pickup location that is within the outer geofence,
    receiving a second indication that the particular user client device has entered the inner geofence; and
    receiving a confirmation that the user has picked up the order at the pickup location.

2. The method of claim 1, wherein receiving the location data further comprises:
receiving a second indication from the particular user client device that the user is currently using a mobile application associated with the online system; and
in response to receiving the second indication, receiving the location data from the particular user client device.

3. The method of claim 1, wherein receiving the location data further comprises:
receiving a second indication from the particular user client device that the user has permitted sharing of the location data; and
in response to receiving the second indication, receiving the location data from the particular user client device.

4. The method of claim 1, further comprising:
receiving customer data along with the location data;
determining an estimated travel time of the user to the location based on the customer data; and
determining the outer geofence at a distance from the location based on the estimated travel time.

5. The method of claim 4, wherein the customer data includes an average speed of the user while in transit, a direction of travel of the user, and current traffic data.

6. The method of claim 1, wherein determining the wait time comprises:
in response to receiving the second indication, determining a start time;
in response to receiving the confirmation, determining an end time; and
computing the wait time based on the start time and end time.

7. The method of claim 1, wherein determining an outer geofence further comprises:
receiving wait time data describing wait times over a recent time period at the location;
determining an average wait time at the location based on the wait time data; and
in response to the average wait time being over a threshold value, increasing a distance of the outer geofence.

8. A computer program product comprising a non-transitory computer readable storage medium having instructions encoded thereon that, when executed by a processor, cause the processor to:
receive an order from one or more user client devices, the one or more user client devices associated with an account of an online system;
transmit a first notification to the one or more user client devices that the order is ready for pick up at a pickup location;
receive location data from a particular user client device of the one or more user client devices, wherein the location data describes location of the particular user client device;
determine an outer geofence based in part on a running average time or wait time at the pickup location in a recent time period, a size of the order, and a historical wait time associated with the account;
receive a first indication from the particular user client device that a user associated with the particular user client device has entered the determined outer geofence;
in response to receiving the first indication, transmit a second notification to a runner client device of a runner indicating that the user associated with the particular user client device is in transit to the pickup location, wherein the runner retrieves the order for the user based on the second notification;
determine the pickup location of a plurality of pickup locations; and
determine an inner geofence of the pickup location that is within the outer geofence,
receive a second indication that the particular user client device has entered the inner geofence; and
receive a confirmation that the user has picked up the order at the pickup location.

9. The computer program product of claim 8, wherein receiving the location data further comprises:
receiving a second indication from the particular user client device that the user is currently using a mobile application associated with the online system; and
in response to receiving the second indication, receiving the location data from the particular user client device.

10. The computer program product of claim 8, wherein receiving the location data further comprises:
receiving a second indication from the particular user client device that the user has permitted sharing of the location data; and
in response to receiving the second indication, receiving the location data from the particular user client device.

11. The computer program product of claim 8, non-transitory computer readable storage medium having additional instructions encoded thereon that, when executed by a processor, cause the processor to:
receive customer data along with the location data;
determine an estimated travel time of the user to the location based on the customer data; and
determine the outer geofence at a distance from the location based on the estimated travel time, wherein the customer data includes an average speed of the user while in transit, a direction of travel of the user, and current traffic data.

12. The computer program product of claim 8, non-transitory computer readable storage medium having additional instructions encoded thereon that, when executed by a processor, cause the processor to:
determine the pickup location of a plurality of pickup locations;
determine an inner geofence of the pickup location that is within the outer geofence;
receive a second indication that the particular user client device has entered the inner geofence; and
receive a confirmation that the user has picked up the order at the pickup location.

13. The computer program product of claim 12, wherein determining the wait time comprises:
in response to receiving the second indication, determine a start time;
in response to receiving the confirmation, determine an end time; and
compute the wait time based on the start time and end time.

14. The computer program product of claim 8, wherein determining an outer geofence further comprises:
receive wait time data describing wait times over a recent time period at the location;
determine an average wait time at the location based on the wait time data; and
in response to the average wait time being over a threshold value, increase a distance of the outer geofence.

15. A computer system comprising:
one or more processors; and a non-transitory computer readable storage medium having instructions encoded thereon that, when executed by the one or more processors, cause the one or more processors to:
  receive an order from one or more user client devices, the one or more user client devices associated with an account of an online system;
  transmit a first notification to the one or more user client devices that the order is ready for pick up at a pickup location;
  receive location data from a particular user client device of the one or more user client devices, wherein the location data describes location of the particular user client device;
  determine an outer geofence based in part on a running average time or wait time at the pickup location in a recent time period, a size of the order, and a historical wait time associated with the account;
  receive a first indication from the particular user client device that a user associated with the particular user client device has entered the determined outer geofence;
  in response to receiving the first indication, transmit a second notification to a runner client device of a runner indicating that the user associated with the particular user client device is in transit to the pickup location, wherein the runner retrieves the order for the user based on the second notification;
  determine the pickup location of a plurality of pickup locations; and
  determine an inner geofence of the pickup location that is within the outer geofence,
  receive a second indication that the particular user client device has entered the inner geofence; and
  receive a confirmation that the user has picked up the order at the pickup location.

16. The computer system of claim 15, wherein receiving the location data further comprises:
  receiving a second indication from the particular user client device that the user is currently using a mobile application associated with the online system; and
  in response to receiving the second indication, receiving the location data from the particular user client device.

17. The computer system of claim 15, wherein receiving the location data further comprises:
  receiving a second indication from the particular user client device that the user has permitted sharing of the location data; and
  in response to receiving the second indication, receiving the location data from the particular user client device.

18. The computer system of claim 15, wherein the one or more processors are further caused to:
  receive customer data along with the location data;
  determine an estimated travel time of the user to the location based on the customer data; and
  determine the outer geofence at a distance from the location based on the estimated travel time.

19. The computer system of claim 15, wherein determining the wait time comprises:
  in response to receiving the second indication, determining a start time;
  in response to receiving the confirmation, determining an end time; and
  computing the wait time based on the start time and end time.

20. The computer system of claim 15, wherein determining an outer geofence further comprises:
  receiving wait time data describing wait times over a recent time period at the location;
  determining an average wait time at the location based on the wait time data; and
  in response to the average wait time being over a threshold value, increasing a distance of the outer geofence.

* * * * *